United States Patent Office 3,196,191
Patented July 20, 1965

3,196,191
HALOGEN-CONTAINING POLYESTER
COMPOSITIONS
Daniel H. Haigh, Beaverton, and Carleton Roberts, Midland, Mich., assignors to The Dow Chemical Company, Midland, Mich., a corporation of Delaware
No Drawing. Filed May 25, 1961, Ser. No. 112,514
8 Claims. (Cl. 260—869)

This invention concerns new polyester resin compositions and method of making the same. It relates more particularly to polymerizable compositions comprising a polymerizable linear polyester of ingredients comprising an adduct of hexachlorocyclopentadiene and tetrahydrophthalic acid or anhydride, a polyhydric alcohol and a reactive ethylenically unsaturated polyfunctional chemical ingredient which retains its active ethylenic unsaturation after being chemically combined in the polyester chain and renders the polyester copolymerizable with olefinic cross-linking agents. The invention also pertains to the polymerized compositions in their finally reacted form, i.e. the insoluble infusible cross-linked polyester compositions.

It is known to prepare polymerizable halogen-containing polyester compositions by reaction of a Diels-Alder type reaction adduct of a hexahalocyclopentadiene with an unsaturated polycarboxylic acid or acid anhydride, e.g. maleic anhydride, with a polyhydric alcohol in admixture with a reactive and unsaturated chemical ingredient such as unsaturated polycarboxylic acids, e.g. maleic acid, fumaric acid, itaconic acid, etc., or unsaturated polyhydric alcohols such as butene-diol, pentene-diol, etc., or unsaturated hydroxy ethers such as allyl or vinyl glycerol ethers, vinyl pentaerythritol ether, etc., which retains its active unsaturation after being chemically combined in the polyester chain, and that such polyesters are reactive with olefinic cross-linking agents such as styrene, divinylbenzene, diallyl phthalate, diallyl maleate and similar mono- or poly-vinyl or mono- or poly-allyl compounds, to form resinous insoluble infusible compositions.

It has now been discovered that new and useful polymerizable halogen-containing polyester resinous compositions can readily be prepared by reaction of an adduct of hexachlorocyclopentadiene and tetrahydrophthalic acid or anhydride with a polyfunctional alcohol in admixture with a reactive and unsaturated chemical ingredient which retains its active unsaturation after being chemically combined in the polyester chain. It has further been found that compositions comprising the polymerizable unsaturated polyesters and an olefinic cross-linking agent, e.g. a mono- or poly-vinyl or vinylidene monomer containing aliphatic carbon to carbon unsaturation, can readily be reacted to produce resinous insoluble infusible products, useful for a variety of purposes.

The adduct of hexachlorocyclopentadiene and tetrahydrophthalic anhydride, preferably employed as a starting material, is a crystalline material melting at a temperature of about 275° C. The compound is identified as 1,2,3,4,9,9 - hexachloro - 1,4,4a,5,6,7,8,8a-octahydro-1,4-methanonaphthalene-6,7-dicarboxylic anhydride, and has the structural formula:

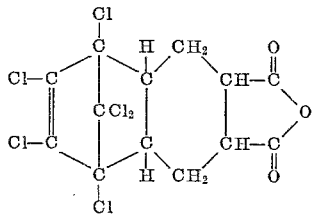

The adduct or compound can be prepared by procedure described in our pending application Serial No. 48,823, filed August 11, 1960, now abandoned.

In brief, the adduct is prepared by a Diels-Alder type reaction by heating approximately equimolar proportions of hexachlorocyclopentadiene and tetrahydrophthalic anhydride in admixture with one another in an inert organic solvent such as heptane, toluene, xylene, ethylbenzene, chlorobenzene, dichlorobenzene and the like at elevated temperatures between about 140° and 200° C. The product separates from the reaction mixture as a solid, from which it is separated by filtering and is purified by recrystallization from a suitable solvent.

The polymerizable polyesters of the invention are prepared by reaction of the adduct starting material with a polyhydric alcohol in admixture with a reactive ethylenically unsaturated polyfunctional chemical ingredient which retains its active ethylenic unsaturation after being chemically combined in the polyester chain, in approximately stoichiometric proportions, i.e. chemically equivalent proportions of carboxylic and hydroxyl groups.

The reactive ethylenically unsaturated polyfunctional chemical ingredient which retains its active ethylenic unsaturation after being chemically combined in the polyester chain and renders the polyester copolymerizable with olefinic cross-linking agents, can be an unsaturated polycarboxylic acid or anhydride such as maleic anhydride, maleic acid, fumaric acid, citraconic acid itaconic acid and the like, or an unsaturated polyhydric alcohol as 1,4-butene-diol or pentene-diol, or polyunsaturated esters such as diallyl phthalate, vinyl acrylate, vinyl methacrylate, etc., or unsaturated hydroxy ethers such as allyl or vinyl ethers of glycerol, (2-hydroxymethyl)-methane, and pentaerythritol, and the like.

The polyhydric alcohol to be employed can be a saturated aliphatic polyol or an ether alcohol such as ethylene glycol, propylene glycol, 1,3-propanediol, 1,4-butanediol, glycerol, (2-hydroxymethyl)-1,3-propanediol, pentaerythritol, diethylene glycol, dipropylene glycol, triethylene glycol, tetraethylene glycol, or mixtures of any two or more of such polyhydric polyols.

As previously mentioned the polymerizable polyesters of the invention are prepared by reaction of the adduct of hexachlorocyclopentadiene and tetrahydrophthalic acid or anhydride with the polyol in admixture with the reactive ethylenically unsaturated polyfunctional chemical ingredient in approximately chemically equivalent proportions of carboxyl and hydroxyl groups in the starting materials. These polyesters contain copolymerizable unsaturation in the polyester chains and are capable of copolymerizing with olefinic cross-linking agents such as vinylidene monomers to form insoluble infusible thermoset polyester resin products.

In a preferred embodiment, the polymerizable compositions comprise a mixture of (A) the polymerizable linear polyester of ingredients comprising (1) the adduct of hexachlorocyclopentadiene and tetrahydrophthalic anhydride, (2) the polyhydric polyol or polyhydric alcohol, and (3) the reactive ethylenically unsaturated polyfunctional chemical ingredient which retains its active ethylenic unsaturation after being chemically combined in the polyester chain and renders the polyester copolymerizable with olefinic cross-linking agents, and (B) a polymerizable olefinic cross-linking agent containing aliphatic carbon to carbon unsaturation.

The olefinic cross-linking agent can be a vinyl or vinylidene monomer such as styrene, vinyltoluene, xinylxylene, ethylvinylbenzene, isopropylstyrene, tert.-butylstyrene, fluorostyrene, bromostyrene, divinylbenzene, divinyltoluene, ethyl acrylate, methyl methacrylate, butyl acrylate, 2-ethylhexyl acrylate, vinyl acetate, diallyl phthalate and the like. Mixtures of any two or more vinyl or vinylidene monomers can also be used.

The polymerizable polyester compositions of the invention can be prepared by first effecting esterification of the adduct of hexachlorocyclopentadiene and tetrahydrophthalic acid with the desired polyhydric alcohols in admixture with the reactive unsaturated chemical ingredient in the desired proportions, whereby the polymerizable polyester is formed, i.e. a polyester chain containing copolymerizable unsaturation in the polyester chain is obtained, then mixing the resulting composition with the desired olefinic cross-linking agent, and thereafter copolymerizing the mixture to form an insoluble infusible polyester resin.

A preferred procedure comprises introducing the selected ingredients to be esterified, in predetermined proportions, into a suitable esterification reaction vessel equipped with heating and/or cooling means, an agitator, means for maintaining an atmosphere of an inert gas such as nitrogen, helium or carbon dioxide over the reaction mixture, means for removing water of esterification, suitably as it is formed in the reaction, and other accessories to the reaction. The reactants are blanketed with an inert atmosphere, preferably nitrogen gas, then agitated and heated to effect the reaction for a desired period of time. The degree of reaction is conveniently determined by employing the acid number technique or by measuring the amount of water liberated in the reaction. The reaction is discontinued when the product has a desired acid member. The polyester product is cooled and may be thereafter mixed with the olefinic cross-linking agent at room temperature or thereabout, and in any desired proportions.

Alternatively, the unsaturated polyesters can be advantageously mixed with the olefinic cross-linking agent at elevated temperatures thereby facilitating solution of the materials and mixing. To prevent premature polymerization at this stage, a polymerization inhibitor is advantageously added to the mixture, or to one of the components prior to mixing, especially if the mixture is to be stored or shipped in commerce, prior to curing or effecting the copolymerization reaction into the insoluble, infusible polyester resin. The curing is usually effected in the presence of a catalyst or promoter for the polymerization such as an organic peroxygen compound, e.g. benzoyl peroxide, tert.-butyl hydroperoxide, di-tert-butyl peroxide, dicumyl peroxide, tert.-butyl peracetate, tert.-butyl perbenzoate, di-tert.-butyl diperphthalate, etc.

The polymerizable polyester compositions of the invention are useful as intermediates or starting materials in the preparation of other and more complex polyester compositions, e.g. in the preparation of lacquers or varnish resins and enamels, but are preferably and advantageously employed in admixture with the olefinic cross-linking agents to produce the polymerizable polyester resinous compositions which cure or cross-link to form insoluble infusible thermoset polyester resin products. Such compositions and products are useful for a variety of purposes in the home and industry such as the preparation of glass fiber or cloth reinforced laminates, as potting resins, as electrical insulating resins and as coatings for wood, metal and plastic objects.

The following examples illustrate ways in which the principle of the invention has been applied, but are not to be construed as limiting the scope.

EXAMPLE 1

(A) A charge of 544 grams (2 moles) of hexachlorocyclopentadiene and 304 grams (2 moles) of cis-4-cyclohexene-1,2 - dicarboxylic anhydride (tetrahydrophthalic anhydride), together with 1500 ml. of ortho-dichlorobenzene as solvent and reaction medium was placed in a glass reaction vessel equipped with a reflux condenser and stirrer. The mixture was stirred and heated at a reflux-ing temperature for a period of 29 hours, then was allowed to cool to room temperature. The product, a crystalline solid, was separated by filtering and was recrystallized from methyl ethyl ketone. There was obtained 525 grams of product as a white crystalline material having a melting point of 275–276° C. The product was 1,2,3,4,9,9-hexachloro 4a,5,6,7,8,8a-octahydro - 1,4 - methanonaphthalene-6,7-dicarboxylic anhydride, having the structural formula

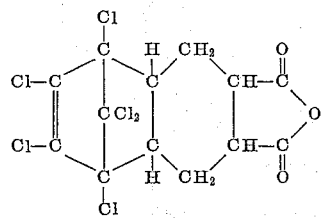

(B) A charge of 424.7 grams of the product prepared in part A above, together with 52.8 grams of ethylene glycol, 90 grams of diethylene glycol and 25 ml. of xylene was placed in a reaction vessel equipped with a reflux condenser and stirrer. The reaction vessel was purged with nitrogen gas. The mixture was stirred and heated to a temperature of 150° C. Thereafter, 70.8 grams of maleic anhydride were added. The resulting mixture was stirred and heated at a temperature of 200° C. until the mixture had an acid number of 55. Thereafter, 3.6 grams of tetrahydrofurfuryl alcohol was added. Heating and stirring were continued until the mixture had an acid number of 45, after which the hot mixture was poured as a layer onto a sheet of polytetrafluoroethylene and allowed to cool to room temperature in an atmosphere of nitrogen gas. The product was a hard brittle polyester resin. It was soluble in organic solvents such as benzene, toluene and chlorobenzene, and is copolymerizable with vinylidene monomers to form insoluble infusible cross-linked polyester resin products.

EXAMPLE 2

(A) A charge of 250 grams of the polyester resin prepared in Part B of Example 1 was stirred with 75 grams of monomeric styrene until homogeneous, then was mixed with 0.75 gram of benzoyl peroxide as catalyst. The resulting mixture was cast into molds and cured by heating at a temperature of 85° C. for a period of 8 hours to form test pieces of ¾ x ½ inch cross section by about 3 inches long. The cured product was a pale yellow, hard, insoluble, infusible, thermoset resinous material, having a density 1.5590 at 25° C., a Shore Hardness D of 89, a heat distortion temperature of 86° C. and was self-extinguishing. Test pieces of the cured product when exposed to the action of light in a Fadeometer for a period of 100 hours were found to have only a slight increase in yellowness.

(B) A portion of the fluid mixture of the polyester resin and monomeric styrene, containing the benzoyl peroxide, prepared in part A above, was employed to prepare a laminate consisting of 13 plys of glass cloth (OC1–181–136) alternately layered upon layers of the fluid mixture, to form a laminate ⅛ inch thick under about 200 p.s.i. gauge pressure, and consisting of about 40.6 percent by weight of the fluid mixture and about 59.4 percent of the glass cloth. The laminate was cured in a mold by heating it at a temperature of 85° C. for a period of 8 hours. The laminate or cured product had a flexural strength of 64,040 pounds per square inch, tensile strength of 51,930 pounds per square inch, elongation of 5.3 percent, and impact strength of 19.22 foot-pounds per inch of width.

(C) A composition similar to that prepared in part A above was prepared, except that vinyltoluene was substituted for the polystyrene employed in part A. The vinyltoluene employed in the experiment was a mixture of approximately 65 percent by weight of meta-vinyltoluene and 35 percent para-vinyltoluene. The fluid mixture was cast into molds and was cured by heating the same at a temperature of 95° C. for a period of 8 hours. The cured product was a colorless transparent thermoset material having a Shore Hardness D of 85, a heat distortion temperature of 56° C. and was self-extinguishing.

EXAMPLE 3

A charge of 20 grams of the polyester resin prepared in part B of Example 1 was mixed with 3 grams of monomeric styrene and 3 grams of methyl methacrylate and 0.6 gram of benzoyl peroxide as catalyst to form a homogeneous material. The mixture was cast into a mold and cured by heating at a temperature of 85° C. for 8 hours. The cured product had a Shore Hardness D of 83 and a heat distortion temperature of 60° C.

EXAMPLE 4

In each of a series of experiments, a charge of the reaction product having a melting point of 275°–276° C., i.e., the adduct of hexachlorocyclopentadiene and tetrahydrophthalic anhydride, prepared by procedure similar to that employed in part A of Example 1, and propylene glycol in molar proportions as stated in the following table was placed in a glass reaction vessel equipped with a reflux condenser and water trap, a stirrer, a nitrogen inlet ture was stirred and heated to a temperature of 100° C. and an electrically heated mantle and control. The mix- in an atmosphere of nitrogen gas. Thereafter, a charge of maleic anhydride in molar proportion as stated in the table was added, together with about 7 percent by weight, based on the sum of the weights of the reactants, of metaxylene as azeotropic agent. The resulting mixture was stirred and heated at a temperature of about 160° C. while azeotropically distilling water from the reaction mixture until the reaction product had an acid number of about 30. The product was then poured onto a sheet of polytetrafluoroethylene, was allowed to cool to room temperature and was crushed to a granular form.

EXAMPLE 5

A charge of 20 grams of the polyester resin prepared in part B of Example 1 and 20 grams of monomeric styrene was shaken until homogeneous. A charge of 0.2 gram of benzoyl peroxide was added and dissolved in the mixture. A portion of the solution was cast as a layer on a sheet of polytetrafluoroethylene and cured by heating at a temperature of 85° C. for a period of 8 hours. The cured coating had a Shore Hardness D of 82 and a heat distortion temperature of 76° C.

EXAMPLE 6

A charge of 20 grams of the polyester resin prepared in part B of Example 1 was dissolved in 46.9 grams of styrene, and 0.27 gram of benzoyl peroxide added. A portion of the solution was cast as a layer on a sheet of polytetrafluoroethylene and cured by heating at a temperature of 85° C. for a period of 8 hours. The cured coating had a Shore Hardness D of 88 and a heat distortion temperature of 85° C.

We claim:

1. A polymerizable composition comprising a polymerizable linear polyester of ingredients comprising (1) an adduct of hexachlorocyclopentadiene and tetrahydrophthalic anhydride, (2) a saturated aliphatic polyol and (3) a reactive ethylenically unsaturated polyfunctional chemical compound containing reactive groups selected from the class consisting of carboxy groups and anhydride groups thereof and hydroxyl groups, which compound retains active ethylenic unsaturation after being chemically combined in the polyester chain and renders the polyester copolymerizable with olefinic cross-linking agents.

2. A composition according to claim 1 wherein the (2) polyhydric alcohol is a mixture of ethylene glycol and diethylene glycol and the (3) reactive ethylenically unsaturated polyfunctional chemical ingredient is maleic anhydride.

3. A polymerizable composition comprising (A) a

*Table I*

| Run No. | Starting Materials | | | Reaction Conditions | | Polyester Product | | | | Remarks |
| --- | --- | --- | --- | --- | --- | --- | --- | --- | --- | --- |
| | HETA moles | Maleic Anhydride Moles | Propylene glycol Moles | Temperature ° C. | Time Hrs. | Chlorine Percent | Acid No. | Shore Hardness D | Heat Distortion Temp. ° C. | |
| 1 | 1.00 | 1.00 | 2.16 | 175 | 14 | 31.13 | 30 | 87–90 | 92 | Opaque, good adhesion to metal. |
| 2 | 0.75 | 1.25 | 2.16 | 160 | 20 | 26.49 | 35 | 87–90 | 150 | Do. |
| 3 | 0.65 | 1.35 | 2.16 | 160 | 12 | 24.27 | 29 | 87–90 | 150 | Transparent, good adhesion to metal. |
| 4 | 0.50 | 1.50 | 2.16 | 160 | 14 | 20.42 | 30 | 87–90 | 150 | Do. |
| 5 | 0.40 | 1.60 | 2.16 | 160 | 16 | 17.42 | 29 | 87–90 | 150 | Do. |
| 6 | 0.30 | 1.70 | 2.16 | 160 | 14 | 13.99 | 30 | 87–90 | 150 | Do. |
| 7 | 0.20 | 1.80 | 2.16 | 160 | 14 | 10.05 | 30 | 87–90 | 150 | Do. |
| 8 | 0.15 | 1.85 | 2.16 | 160 | 14 | 7.83 | 40 | 87–90 | 150 | Do. |

Portions of the product were dissolved in xylene to form a 50 weight percent solution of the polyester resin in the solvent. The solution was coated on satin finish steel panels to form a layer three mils thick and was dried in air at room temperature for a period of 80 hours. The dried coating was observed for color, hardness and adhesion to the metal.

Table I identifies the experiments and gives the molar proportions of the ingredients employed in making the polyester resin. The table also gives the reaction conditions, i.e., the time and temperature for which the mixture was cooked or reacted. The table also gives the acid number of the product or polyester resin, its color (Gardner-Holdt) and adhesion to metal.

In the table the symbols HETA are used to designate the adduct of hexachlorocyclopentadiene and tetrahydrophthalic anhydride, for brevity.

polymerizable linear polyester of ingredients comprising (1) an adduct of hexachlorocyclopentadiene and tetrahydrophthalic acid, (2) a polyhydric alcohol, and (3) a reactive ethylenically unsaturated polyfunctional chemical compound containing reactive groups selected from the class consisting of carboxy groups and anhydride groups thereof, and hydroxyl groups which compound retains active ethylene unsaturation after being chemically combined in the polyester chain and renders the polyester copolymerizable with olefinic cross-linking agents and (B) a polymerizable compound containing aliphatic carbon to carbon unsaturation and different from the reactive ethylenically unsaturated polyfunctional chemical compound of (3).

4. A composition according to claim 3 wherein the (2) polyhydric alcohol is a mixture of ethylene glycol and diethylene glycol, the (3) reactive ethylenically unsaturated polyfunctional chemical compound is maleic anhydride and wherein said (B) polymerizable compound is a monoethylenically unsaturated monomer different from the reactive ethylenically unsaturated polyfunctional chemical compound of (3).

5. A composition according to claim 4, wherein said (B) polymerizable compound is a monovinyl aromatic compound.

6. A composition according to claim 4, wherein said (B) polymerizable compound is a mixture of styrene and methyl methacrylate.

7. A composition according to claim 5, wherein said (B) polymerizable monovinyl aromatic compound is styrene.

8. A composition according to claim 5, wherein said (B) polymerizable monovinyl aromatic compound is vinyltoluene.

References Cited by the Examiner
UNITED STATES PATENTS

| | | | |
|---|---|---|---|
| 2,783,215 | 2/57 | Robitschek et al. | 260—869 |
| 3,017,431 | 1/62 | Schmerling | 260—514 |

MURRAY TILLMAN, *Primary Examiner.*

WILLIAM H. SHORT, LEON J. BERCOVITZ, JAMES A. SEIDLECK, *Examiners.*

UNITED STATES PATENT OFFICE
CERTIFICATE OF CORRECTION

Patent No. 3,196,191　　　　　　　　　　　　　　July 20, 1965

Daniel H. Haigh et al.

It is hereby certified that error appears in the above numbered patent requiring correction and that the said Letters Patent should read as corrected below.

Column 3, line 9, strike out "chain"; column 5, line 28, strike out "ture was stirred and heated to a temperature of 100° C." and insert the same after "mix-" in line 29, same column 5.

Signed and sealed this 29th day of March 1966.

(SEAL)
Attest:

ERNEST W. SWIDER　　　　　　　　　　　　　　EDWARD J. BRENNER
Attesting Officer　　　　　　　　　　　　　　　　Commissioner of Patents